United States Patent [19]

Nagaoka et al.

[11] Patent Number: 5,244,288
[45] Date of Patent: Sep. 14, 1993

[54] METHOD AND APPARATUS FOR BRAILLE DISPLAY OF INFORMATION FROM CRT SCREEN

[75] Inventors: Hideji Nagaoka, Abiko; Shunsuke Yamagata, Ibaraki; Joji Ando, Tsukuba; Kiyoshi Kawamura, Nagoya; Koichi Urakami, Nagoya; Satoru Kondo, Nagoya, all of Japan

[73] Assignee: Mitsubishi Jukogyo Kabushiki Kaisha, Tokyo, Japan

[21] Appl. No.: 901,076

[22] Filed: Jun. 19, 1992

[30] Foreign Application Priority Data

Jul. 15, 1991 [JP] Japan .................................. 3-174058

[51] Int. Cl.⁵ .............................................. B41J 3/32
[52] U.S. Cl. ..................................... 400/122; 434/114; 434/115; 434/411
[58] Field of Search .............. 400/122; 434/112, 113, 434/114, 115, 408, 411, 412; 101/18, 32

[56] References Cited

U.S. PATENT DOCUMENTS

| | | | |
|---|---|---|---|
| 2,849,752 | 9/1958 | Leary | 101/32 |
| 3,103,074 | 9/1963 | Daugherty | 434/113 |
| 3,381,299 | 4/1968 | Hu | 101/35 |
| 3,624,772 | 11/1971 | Grumwald | 434/114 |
| 4,586,903 | 5/1986 | Burchart | 434/114 |
| 4,670,794 | 6/1987 | Araki et al. | 434/412 |

FOREIGN PATENT DOCUMENTS

| | | | |
|---|---|---|---|
| 102772 | 6/1983 | Japan | 400/122 |
| 247066 | 10/1988 | Japan | 400/122 |

*Primary Examiner*—Edgar S. Burr
*Assistant Examiner*—Stephen R. Funk
*Attorney, Agent, or Firm*—Jacobson, Price, Holman & Stern

[57] ABSTRACT

A method and apparatus whereby information appearing on a CRT screen (410) is separately displayed in braille, using a braille web (100) in a loop form and made partly or wholly from a shape memory resin. The information from a CRT screen (410) is input to the web (100) by a braille printer (300) at a temperature within a range below the glass transition temperature of the resin. After the information has been read by the user, the displayed web portion is heated above the glass transition temperature by a heating roller (200) so that the web recovers its original, non-braille shape. The web is conveyed by a driving roller (210) along with the heating roller (200) and a driven roller (220) in the directions indicated by arrows in FIG. 1 for repeated use.

5 Claims, 3 Drawing Sheets

METHOD AND APPARATUS FOR BRAILLE DISPLAY OF INFORMATION FROM CRT SCREEN

BACKGROUND OF THE INVENTION

The present invention relates to a method and an apparatus for separately displaying in braille the information appearing on a cathode-ray-tube (CRT) screen, using a shape memory resin as a display medium.

For the purposes of the invention the term "braille" is intended not merely to mean the braille in a limited sense but to encompass all other representations of characters, symbols, and patterns in tangible forms for reading by touch. By a "braille web" is meant any web or web-like layer for recording the braille. The expression "recovery of the braille web" is used to mean correcting or erasing part or whole of the braille and allowing the web to recover its original, non-brailled shape.

In order that a visually handicapped person may have an access to the information displayed on a CRT screen, it has been necessary to transcribe the information in braille or pin display characters that can be read via the fingertips. Braille is a system of writing texts as combinations of tangible symbols so devised that the visually handicapped person can read them by touch. The symbols are represented each by a plurality of raised dots in a cell formed on a braille paper made chiefly of pulp fiber.

A pin display is a device for projecting from a plate surface a plurality of pins in suitable combinations in the same arrangement as in braille. Transcription of the information appearing on a CRT screen into braille or pin display characters is a two-step practice, first forming braille codes from the text information using a character/braille conversion software and then driving a braille printer or pin display for printing on braille paper or for pin displaying.

Conventional methods of transcribing the information from a CRT screen into braille or pin displaying have the following drawbacks.

When printing with a braille printer, the braille paper must be replaced by a new, blank sheet each time the display on the CRT screen is shifted from scene to scene. Once printed, the ordinary braille paper cannot be reused, and this adds greatly to the cost of braille displaying of the information from a CRT that handles an enormous volume of data. Pin display, on the other hand, is a device only suited for displaying an amount of information enough for about one line at a time. It takes an unduly long period of time to display a CRT screenful of information. Rebuilding the device to display the whole-screen information would make the construction so complex that the manufacture and maintenance would involve too much difficulties for the realization of the scheme.

BRIEF SUMMARY OF THE INVENTION

An object of the present invention, in view of the foregoing, is to provide a method and an apparatus for braille display of information appearing on a CRT screen, using a braille web made of a shape memory resin which permits the recorded braille characters to be easily erased and allows the web to recover its original shape or non-recorded state for repetitive use.

The above object is achieved by a method of the invention for braille display of information appearing on a CRT screen, which comprises converting the information into braille information, printing the braille information on a braille web of a shape memory resin by a braille printer, conveying the braille web in succession to a display window so that the user can read it, subsequently heating at least the printed area of the braille web to a temperature above the glass transition temperature of the shape memory resin so as to erase the recorded information and to restore the original, non-recorded state of the web, and repeating the aforesaid steps, whereby the information on the CRT screen can be continuously displayed in braille.

The above object is also achieved by an apparatus of the invention for braille display of information appearing on a CRT screen, comprising a CRT display, a converter for converting the information on the CRT screen into braille information, a braille printer for printing the braille information from the converter on a braille web, braille web feeder means for continuously feeding the braille web formed from a shape memory resin to the braille printer, a display window disposed downstream of the braille printer to provide the user with an access to the braille information transcribed on the braille web, and a heater located further downstream of the display window to heat at least the printed area of the braille web.

A shape memory resin markedly changes its modulus of elasticity below and above its glass transition region or a temperature range including its glass transition temperature $T_g$. It is deformed with permanent strain when subjected to an external force at a temperature below the glass transition temperature $T_g$. The permanent strain, however, disappears when the resin is heated above the glass transition temperature $T_g$. Thus the shape memory resin, after being deformed, can recover its original shape on heating to a temperature above its glass transition temperature $T_g$.

When a material consisting partly or wholly of such a shape memory resin is formed into a sheet or web at a temperature below the glass transition temperature $T_g$ and is employed in place of the existing braille paper, it is possible to record in braille the information, including patterns, that appears on a CRT screen at room temperature which is lower than the glass transition temperature $T_g$. Since the permanent strain that has resulted from the braille recording can be eliminated upon heating above the glass transition temperature $T_g$, the braille web recovers its original shape. Consequently, the braille web can be used repeatedly, and the apparatus for the braille display of CRT-screen information can be simplified in construction, and related costs are reduced.

BRIEF DESCRIPTION OF THE DRAWINGS

The present invention will now be described in detail with reference to the accompanying drawings wherein.

DETAILED DESCRIPTION OF PREFERRED EMBODIMENTS

Figure 1:
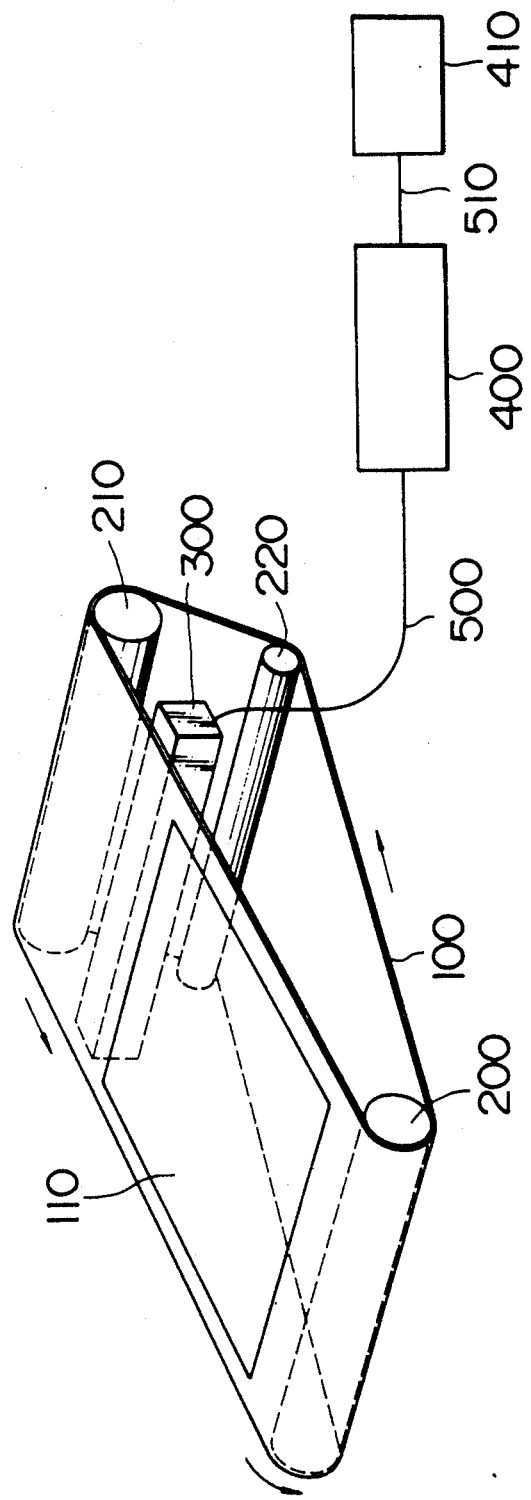
FIG. 1 is a perspective view of the first embodiment of the CRT information-braille display apparatus according to the present invention.
Figure 2:
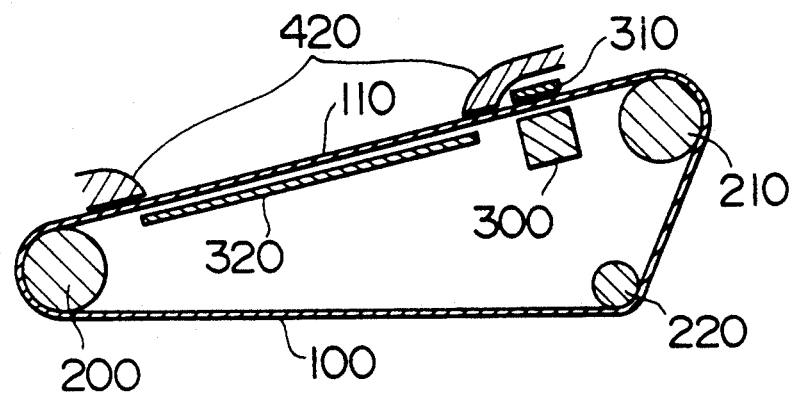
FIG. 2 is vertical cross-sectional view showing the essential parts of the first embodiment of the invention.

FIG. 1 shows, in perspective, the first embodiment of the CRT-information braille display apparatus of the invention, and FIG. 2 shows, in cross section, the essential parts of the embodiment. In these figures, an endless braille web 100 in loop form is made partly or wholly of a shape memory resin. It is driven by means of a heating roller 200 and driving roller 210, and guided by driven roller 220 in the directions indicated by the arrows in the figures.

Figure 3A:
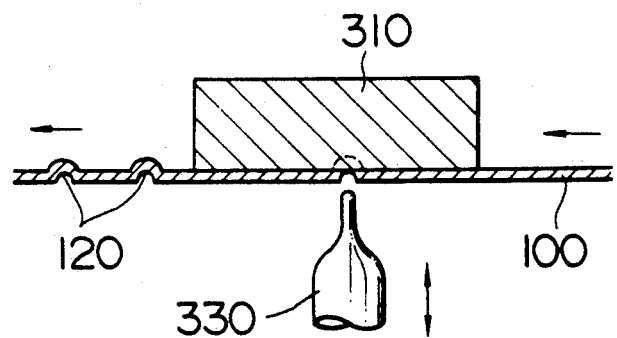
FIGS. 3(A) and 3(B) are detailed cross-sectional and side views, respectively, illustrating the construction of the printing section in the first embodiment.
Figure 3B:
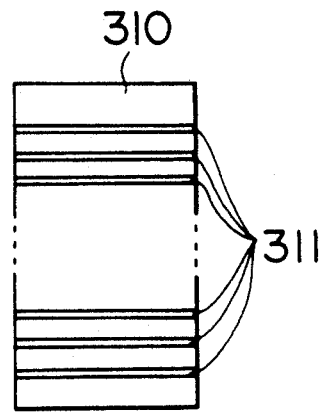

Information from a CRT screen 410 is transmitted through a cord 510 to a character-pattern/braille converter 400, where it is converted to braille information. The latter then is sent via a cord 500 to a braille printer 300. The braille printer 300 prints the inputted braille characters or graphical patterns onto the braille web 100 in a temperature region below the glass transition temperature. As FIG. 3(A) shows, the printing is carried out as a needle 330 moves reciprocatingly up and down and left to right. An upper presser plate 310 is located on the side of the braille web opposite to the needle 330 to provide protection for the web and ensure clear impression of the braille characters. The presser plate 310 is formed with grooves 311 as shown in FIG. 3(B) to protect the braille information from being marred by scratching or catching of the braille web 100 while being fed.

The information 120 printed on the braille web 100 is conveyed to a display window 110 which is large enough to represent the whole data from the CRT screen 410 and allow the user ready access to the tangible information for reading. As indicated in FIG. 2, the display window 110 is protected with an outer frame 420 secured partly or wholly to the housing of the braille display apparatus so as to keep the user's hand off from the braille printer 300 or the heating roller 200. The window 110 is also protectively supported from below by an under plate 320 lest the braille web 100 be elongated by the fingertips that come in touch.

The braille web 100 is driven from the display window 110 to the heating roller 200, where it is heated above the glass transition temperature to recover its original, non-brailled shape. The recovered braille web is moved farther by the heating roller 200, driving roller 210, and free roller 220 in the direction indicated by the arrows in FIG. 1 for repeated use.

Figure 4:
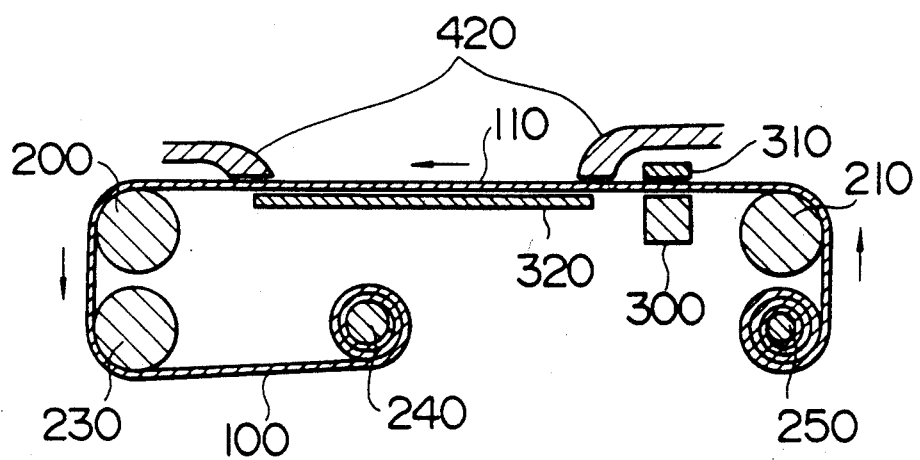
FIG. 4 is a vertical cross-sectional view of the essential parts of the second embodiment of the invention.

Another embodiment of the CRT-information braille display apparatus according to the invention is shown in FIG. 4 as a cross-sectional view of its essential parts. Here the braille web 100 is not in loop form but is wound up in a roll on a feed roller 250. The braille web 100 unwound from the feed roller 250 is printed by a braille printer 300 and moved to a display window 110 for reading by the user. Next, the information transliterated in braille is erased by the heating roller 200 and the web restores its original, non-brailled state. The web then is pulled by a roller 230 and rewound by a take-up roller 240 for recovery.

The recovered roll of braille web 100 is set again on the feed roller 250 for repeated service. As a further alternative, this embodiment may dispense with the heating roller 200 so that, without the application of heat, the information transcribed on any desired web area can be stored unerased.

As has been described concretely in connection with the embodiments of the present invention, the use of a braille web consisting wholly or partly of a shape memory resin permits the restoration of the pre-brailled state of the web by heating above the glass transition temperature after the brailled information from a CRT screen has been read. Hence the advantage of continuously displaying the information from the CRT screen on a limited quantity of braille web.

We claim:

1. A method for displaying in braille information appearing on a CRT screen, comprising:

converting information appearing on a CRT screen into braille information;

providing a braille web of a shape memory resin having a glass transition temperature below which said memory resin is permanently deformable and above which said memory resin recovers the original shape thereof;

providing a braille printer and a display window;

conveying said braille web in a web path to said braille printer and said display window so that a user can read printed braille information on said web at said display window;

printing said braille information on said braille web by said braille printer;

heating at least a printed area of said braille web containing said printed braille information downstream of said display window in said web path to a temperature above said glass transition temperature to erase said printed braille information from said braille web and restore said braille web to the original, non-printed state thereof; and repeating said converting, conveying, printing, and heating steps so that said information on said CRT screen is continuously displayed in braille.

2. An apparatus for displaying in braille information appearing on a CRT screen, comprising:

a CRT screen;

a converter for converting information on said CRT screen into braille information;

a braille web of a shape memory resin;

braille web feeder means for continuously feeding said braille web along a web path;

a braille printer disposed adjacent said web path for printing said braille information from said converter on said braille web;

a display window disposed downstream of said braille printer along said web path to provide a user with access to said braille information printed on said braille web; and heating means located downstream of said display window in the direction of and adjacent to said web path for heating at least a printed area of said braille web containing said printed information to erase said printed braille information from said web.

3. The braille display apparatus as claimed in claim 2, wherein:

said braille web feeder means comprises a plurality of rollers, one of said rollers being a driving roller; and said braille web comprises an endless loop extending in said web path around and engaging with said rollers.

4. The braille display apparatus as claimed in claim 3, wherein:

said heating means comprises one of said rollers being a heating roller disposed downstream of said display window.

5. The braille display apparatus as claimed in claim 2, wherein:

said braille web feeder means comprises a plurality of rollers, one of said rollers being a feed roller and another of said rollers being a takeup roller; and said braille web is wound in the form of a roll on said feed roller for unrolling therefrom and is wound on said takeup roller for rewinding the unrolled web.

* * * * *